Oct. 19, 1954     S. O. STAGEBERG     2,691,896
VARIABLE SPEED POWER TRANSMISSION
Filed Oct. 14, 1949     2 Sheets—Sheet 1

Inventor
STERLING O. STAGEBERG
By Caswell & Lagaard
Attorney

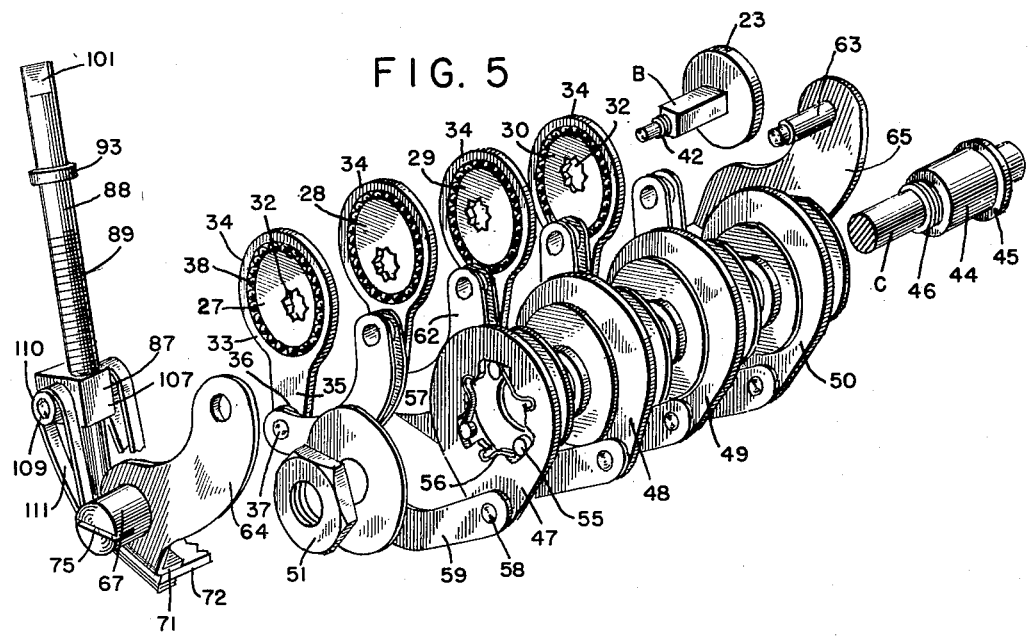
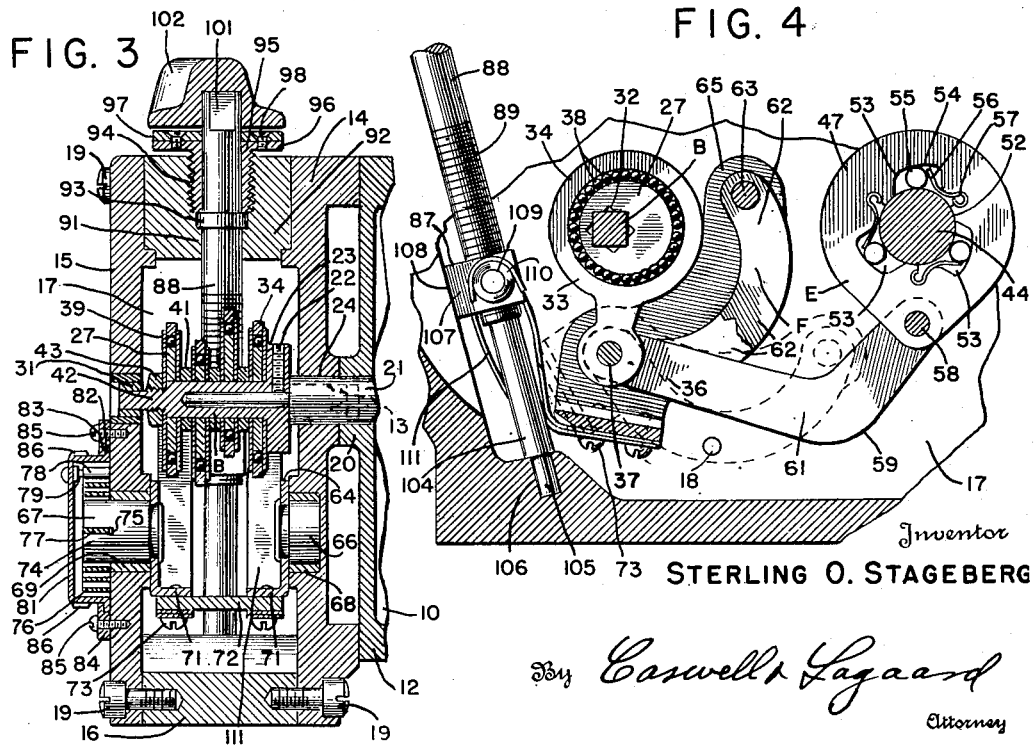

Patented Oct. 19, 1954

2,691,896

UNITED STATES PATENT OFFICE 2,691,896

VARIABLE SPEED POWER TRANSMISSION

Sterling O. Stageberg, Minneapolis, Minn.

Application October 14, 1949, Serial No. 121,264

4 Claims. (Cl. 74—119)

My invention relates to variable speed power transmissions and has for an object to provide a power transmission which is highly practical and exceedingly efficient.

Another object of the invention resides in providing a power transmission of the crank and ratchet type which may be operated at a high rate of speed.

A still further object of the invention resides in providing a variable speed power transmission which may be readily constructed by ordinary machining methods and at a relatively low cost.

Another object of the invention resides in providing a variable speed power transmission in which the shock occasioned by the crank and ratchet mechanism may be largely absorbed and prior to being imparted to the driven element whereby a smooth uniform torque is procured at the driven element.

An object of the invention resides in providing a variable speed power transmission in which the parts are arranged to form a small and compact structure.

Another object of the invention resides in providing shock absorbing means built into the links and bearings of the transmission.

A still further object of the invention resides in providing the power transmission with yieldable links adapted to partially take up the shock produced by the crank and ratchet mechanism.

An object of the invention resides in disposing the control device of the power transmission between the crank mechanism and the ratchet mechanism.

The invention disclosed in this application comprises a variable speed power transmission confined within a case A. This power transmission utilizes a driving shaft B and a driven shaft C. Associated with the driving shaft A is a crank mechanism D while associated with the shaft B is a ratchet mechanism E. The crank mechanism D includes a plurality of connecting rods and the ratchet mechanism E includes a plurality of ratchet arms which are connected to the connecting rods by means of suitable linkage. The speed of the driven shaft B is determined by a control device F which includes control links pivoted to the connecting rods and a movable control shaft. Control arms pivoted to the case and to the control shaft serve to support the control links for movement to vary the operation of the ratchet mechanism.

In the drawings:

Fig. 3 is an elevational sectional view taken on line 3—3 of Fig. 1.

Fig. 4 is a fragmentary elevational sectional view taken on line 4—4 of Fig. 2.

Fig. 5 is an exploded perspective view of the crank mechanism and ratchet mechanism of the invention.

Figure 1:
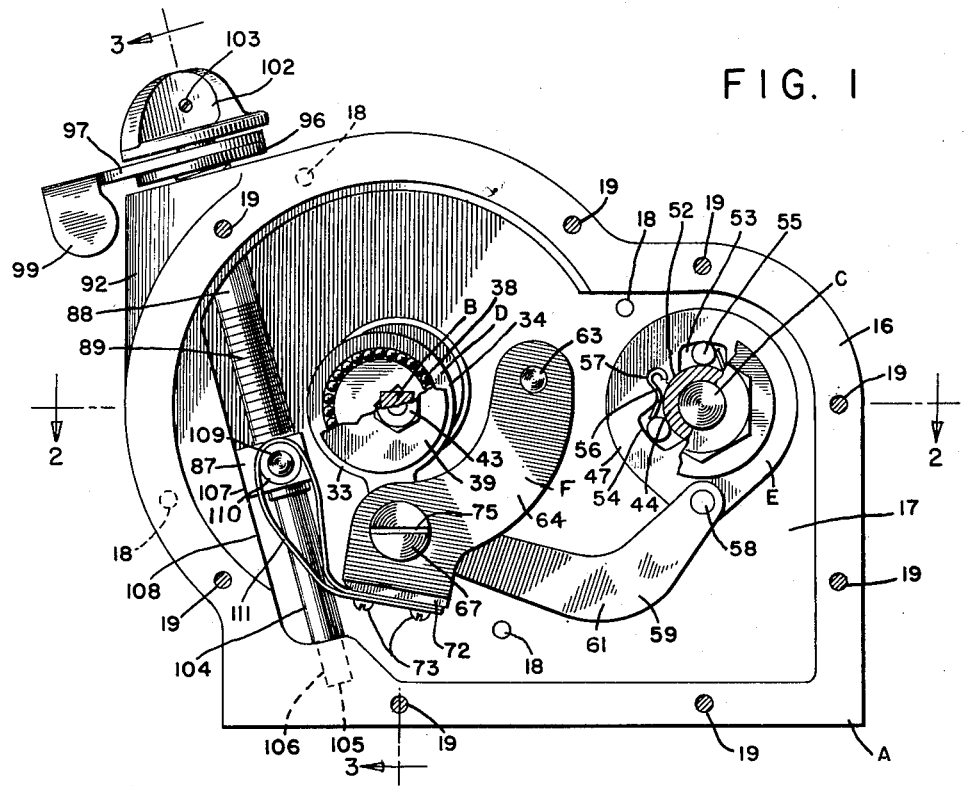
Fig. 1 is an elevational view of a variable speed power transmission illustrating an embodiment of my invention and with the cover plate removed and with portions of the crank mechanism and ratchet mechanism cut away to illustrate the construction thereof.

My variable speed control device has been illustrated in the drawings as applied to an electric motor 10 which may be of ordinary construction. This motor has a case 11 and to which is attached an end bell 12. The said motor is provided with the usual rotor, not shown, and which has attached to it a motor shaft 21 which is journalled in suitable bearings in the end bell 12, one of which is indicated by the reference numeral 20.

The case A of the invention includes two end plates 14 and 15 which are spaced from one another by means of a wall structure 16. The end plates 14 and 15 and the wall structure 16 form a chamber 17 within the case and in which the mechanism of the invention is disposed. The end plate 14 is bolted to the end bell 12 by means of screws 18 which extend completely through the motor housing and which are screwed into the said end plate. Other screws 19 extend through the end plates 14 and 15 and are screwed into the wall structure 16 and serve to clamp the parts of the case together.

The armature shaft 21 has a bore in it and into which is pressed a stub shaft 13 which travels with the said armature shaft. Said armature shaft in addition to being journaled in bearing 20 is further journaled in a bearing 24 formed in the end plate 14. The shaft B is square in cross section and has a flange 23 at the end of the same. The stub shaft 13 extends into the said flange and shaft and is secured thereto by means of a set screw 22. The shaft B is thus supported at one end for rotation by the bearing 24 and has a threaded stud 42 at its other end, which is journaled in a bearing 31.

The driven shaft C is arranged with its axis parallel to the axis of the shaft B and spaced therefrom. This shaft is journaled in bearings 26 mounted in the end plates 14 and 15 and extends outwardly beyond the end plate 15.

The crank mechanism D consists of a number of cranks all identical in construction and indicated by the reference numerals 27, 28, 29 and 30 and which are mounted on the shaft B. These cranks are in the form of eccentric discs which are best shown in Fig. 4. Inasmuch as all of the cranks are of the same construction only the crank 27 and the associated structure will be described in detail. The eccentric disc 27 is formed with a serrated opening 32 having eight serrations adapted to receive the shaft B at eight different angular positions with reference thereto. The opening 32 is eccentric with respect to the axis of the disc 27 so as to produce the desired throw when the shaft B is rotated. The disc 27 is constructed from sheet metal which is stamped to form the opening 32 and to give the desired contour to the disc. Encircling the disc 27 is a connecting rod 33 which has an eccentric strap 34 encircling the eccentric disc 27 and spaced therefrom. An arm 35 extends downwardly from the strap 34 and terminates in a boss 36 bored to receive a rivet 37 which serves as the wrist pin of the said connecting rod. The connecting rod 33 is also constructed of sheet metal stamped in the form disclosed and is of the same thickness as the eccentric disc 27. Between the strap 34 and the disc 27 are disposed a series of balls 38 which form a ball bearing for rotatably supporting the connecting rod with respect to the crank 27. Retainer discs or plates 39 are disposed on opposite sides of the eccentric disc 27 and the connecting rods 33 and hold the balls in position between said connecting rod and eccentric discs. Spacers 41 are positioned between said retainer discs and hold the parts in proper relation.

In the assembly of the crank mechanism the parts are threaded on the shaft B with the cranks 27, 28, 29 and 30 progressively rotated 90 degrees with respect to one another with the end retainer disc 39 butting up against the flange 23.

The end of the shaft B is constructed with the threaded stud 42 on which is screwed a nut 43. Nut 43 screws up tight against the end of the shaft B and said shaft is of a length such that it accommodates the various cranks, retainer discs and spacers giving the desired clearances between the various parts.

Figure 2:
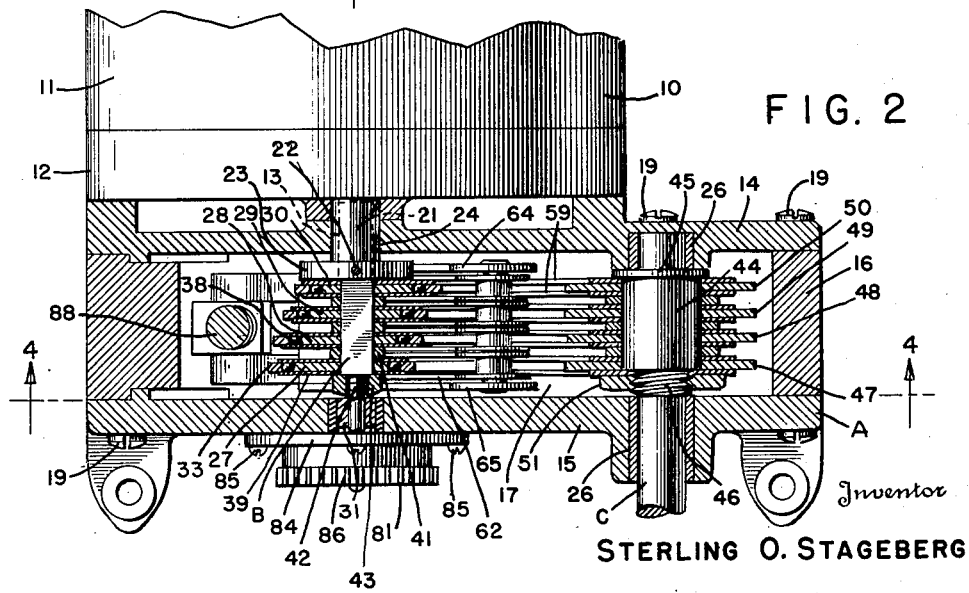
Fig. 2 is a plan sectional view taken on line 2—2 of Fig. 1.

The ratchet mechanism E is best shown in Figs. 2 and 4. This mechanism includes a rotor 44 which is formed on the shaft C. Adjacent said rotor at one end thereof is a flange 45. Adjacent the other end of the rotor is formed on the shaft C threads 46 and on which is screwed a nut 51. Mounted on the rotor 43 are a number of ratchet arms 47, 48, 49 and 50 which correspond with the cranks 27, 28, 29 and 30. These ratchet arms are also constructed of sheet metal and are stamped in the desired form. These ratchet arms are of the same thickness as the cranks 27, 28, 29 and 30 and are arranged in coplanar relation with respect thereto. Due to the similarity of these parts only the ratchet arm 47 and the associated structure will be described in detail. The ratchet arm 47 has a bore 52 therein and which receives the rotor 44 guiding the said parts for relative rotation. In the arm 47 are formed three pockets 53 which intersect the bore 52. These pockets are formed to provide spiraling edges 54 which serve as cams and which face the outer surface of the rotor 44. In the pockets 53 are disposed rollers 55 which fit in between the cams 54 and the surface of the rotor 43. These rollers are forced into engagement with said cam and rotor by means of leaf springs 56 which are anchored in sockets 57 formed in said ratchet arm. The rollers 55 have a length less than one-half their diameter. Encircling the rotor 44 and disposed on opposite sides of each of the ratchet arms 47, 48, 49 and 50 are discs 125 similar to the discs 39 of the crank mechanism D. Spacers 126 similar to spacers 41 are disposed between adjacent pairs of discs. By adjusting nut 51 on threads 46 any degree of clearance can be procured between the rollers and ratchet arms and the discs 125. Thus the discs hold the rollers in parallelism with the axis of the rotor 44 and guide the ratchet arms for movement in planes at right angles to the axis of said rotor and retain the springs 56 in tangential contact with the rollers. By means of the construction shown a friction ratchet is formed between the arm 47 and the rotor 44 whereby movement of the arm 47 in a clockwise direction affords movement of the rotor 44 and movement in the opposite direction is ineffective to rotate the shaft C.

The ratchet arm 47 has attached to it a rivet 58 which serves as a wrist pin. Straddling the ratchet arm 47 and the connecting rod 33 forming a part of crank 27 are two drive links 59. The rivet 58 extends through these links and is riveted thereto. A rivet 37 similarly extends through the said links connecting rod 33 and pivotally connect said link to the said connecting rod. The links 59 have bights 61 formed in the same which serve a purpose to be presently described.

The control device F consists of pairs of control links 62 which straddle the pairs of drive links 59 and which are pivoted through the rivets 37 to the connecting rods 33 and the links 59. The rivets 37 are riveted over these links and hold the parts assembled. A control shaft 63 extends through the upper ends of all of the links 62 and serves to move all of said links in unison. The shaft 63 is attached to two arms 64 and 65 which in turn have attached to them trunnions 66 and 67. The trunnion 66 is journaled in a rubber or similar flexible bearing 68 mounted in the end plate 14 while the trunnion 67 is journaled in a similar bearing 69 mounted in the end plate 15. The trunnion 67 extends outwardly beyond the outer surface of the end plate 15. The arms 64 and 65 are formed with inturn flanges 71 which are secured to a tie bar 72 by means of screws 73. The tie bar 72 is disposed beneath the connecting rods 33 and permits of swinging of said connecting rods without interference. By means of this construction the two arms 64 and 65 are rigidly tied together and move as a unit causing the shaft 63 to swing about the axis of the trunnions 66 and 67 and parallel to the axis of the shaft B.

The trunnion 67 is urged for rotation in a counterclockwise direction as viewed in Fig. 1 by means of the following construction: The end 74 of said trunnion extends outwardly beyond the bearing 69 and is formed with a slot 75. Encircling the said end of the trunnion is a spiral spring 76 which has one end 77 hooked in the slot 75. The other end of said spring is formed with a loop 78 through which a pin 79 extends. Pin 79 is attached to a circular cover 81 which encloses the said spring and the end 74 of said trunnion. The cover 81 has a flange 82 formed on the same and which is received in a groove 83 in a retaining ring 84. This ring is held attached to the end plate 15 by means of screws 85 which pass through said ring and are screwed into the end plate 15. The outer periphery of the cover 81 is formed with flutes 86 which permit of manually rotating the cover. The cover 81 is turned in the ring 84 until the desired tension is placed on the spring 76 after which the screws 85 are tightened down and the said cover clamped in position. In this manner the desired force for rotating the shaft 63 in a counterclockwise direction is procured.

The shaft 63 may be rotated in a clockwise direction by means of an adjusting mechanism indicated in its entirety by the reference numeral 87. This adjusting mechanism consists of a threaded spindle 88 having threads 89 on the same intermediate its ends. One end of the said spindle is journaled in a bearing 91 formed in a boss 92 on the wall structure 16. At this end of the spindle is formed a collar 93 which is received in a threaded opening 94 formed in the said wall structure at the end of the bearing 91. A threaded bushing 95 is adapted to screw into the opening 94 and to engage the collar 93. When the said bushing is screwed down the said collar is clamped in position against the end of the bearing 91 and rotation of the spindle 88 is prevented. The bushing 95 is formed with a flange 96. An operating member 97 overlies this flange and is adapted to be attached thereto by means of screws 98. This operating member has a finger piece 99 by means of which the same may be operated. The extreme end of the spindle 88 is formed with a flat 101. A knob 102 is mounted on this end of the spindle and is provided with a set screw 103 adapted to engage the flat 101. The lower end 104 of the spindle 88 is reduced in diameter to a depth below the threads 89 while the extreme end 105 of said spindle is further reduced in diameter and is mounted for rotation in a bearing 106 formed in the wall structure 16. The threads 89 on the spindle 88 are adapted to screw into a nut 107 which is slidable along a guide 108 formed on the wall structure 16 and which prevents rotation thereof. This nut has secured to the same two trunnions 109 which issue outwardly therefrom on opposite sides. Encircling these trunnions are rubber or similar flexible bushings 110. Two straps 111 encircle the said bushings and are attached to the underside of the tie bar 72 by means of the screws 73 previously referred to. When the nut 107 is raised by rotation of the spindle 88 through knob 102 the straps 111 swing the tie bar 72 in a manner to cause clockwise rotation of the shaft 63 about the axis of the trunnions 66 and 67 as pivots and against the action of the spring 76. By means of the flexible bushings 110 and the flexible bearings 68 and 69 the control device F is resiliently connected to the crank mechanism D. The throw of the ratchet arms 47 etc., being controlled by the position of the members of the control device F, variations in the movement of the parts of the crank mechanism are imparted to the members of the control device and their position shifted to vary the movement of the ratchet arms 47 etc. By this means more uniform movement of the driven shaft is obtained and less strain on the entire mechanism results.

The shaft 63 may be moved from the position shown in full lines in Fig. 4 to the position shown in dotted lines by rotation of the screw 88 in a clockwise direction. When the position is as shown in dotted lines the said shaft is substantially in alignment with the wrist pins 37 and 58. At such locality the links 62 prevent lateral movement of the links 59 and only permit vertical movement of the wrist pins 37. This causes no movement of the crank arms 47, 48, 49 and 50 and consequently no movement of the shaft B. When the adjusting device is moved to the position shown in full lines in Fig. 4 movement of the wrist pins 37 is partly transverse and a rocking movement of the ratchet arms 47 is procured. As each ratchet arm moves in a clockwise direction, rotor 44 and shaft C are rotated in the same direction. When the said ratchet arms are moved in the opposite direction no reverse movement of the shaft C occurs. The cranks 27, 28, 29 and 30 being all arranged in progressive angular relation upon the shaft B the said cranks operate to progressively rotate the shaft C in a step by step fashion. The movement procured by these various cranks is thus progressive and the shaft C operates at a substantially uniform rate of speed. By changing the position of the control shaft 63 the transverse component of the movement of the links 59 can be controlled and correspondingly the speed of the shaft C. Thus the speed of the said shaft may be varied from between zero and maximum through an infinite number of increments of speed.

The advantages of the invention are manifest. An extremely compact construction is provided in which all of the parts are disposed in a small space. By the utilization of the specific construction employed with the ratchet and crank mechanisms, metal stampings may be readily employed. By use of rollers whose length is less than half the diameter of the roller and by using retaining plates or discs for holding the rollers within the pockets in the ratchet arms, a simple construction is provided whereby the retainer plates maintain the rollers in axial parallelism with the driven shaft and at the same time hold the said rollers within the pockets. By means of the bights formed in both the control links and the drive links the movement of the control shaft may be greatly increased thus permitting of appreciable variation of the speed of the driven shaft. At the same time the links bend slightly and thereby assist in taking up the shock resulting from operation of the cranks. Such action is further augmented by the use of flexible bearings and bushings in the control device whereby uniform movement of the driven shaft results. My invention can be constructed at a nominal expense and is quiet in operation and positive in action. With my invention great reduction in speed can be procured to the point of arresting movement of the driven shaft.

Changes in the specific form of my invention, as herein described, may be made within the scope of what is claimed without departing from the spirit of my invention.

Having described my invention, what I claim as new and desire to protect by Letters Patent is:

1. In a power transmission, a driving shaft, a crank operated by said driving shaft, a connecting rod operated by said crank, a driven shaft spaced from said driving shaft, ratchet means for rotating said driven shaft and including a ratchet arm pivoted coaxially with respect to said driven shaft, said connecting rod and ratchet arm extending substantially in the same direction, a drive link extending between said connecting rod and ratchet arm, pivot means between said drive link and said ratchet arm, pivot means between said drive link and connecting rod, said last named pivot means having its axis fixed relative to said connecting rod, a speed control having a control arm, pivot means at one end thereof, having its axis fixed relative to said driving shaft, a control link, pivot means between one end thereof and the other end of said control arm, pivot means between the other end of said control link and said connecting rod, said last named pivot means being coaxial with the pivot means between said connecting rod and drive link, said control arm extending from its fixed pivot means and into a space bounded by said connecting rod, drive link and ratchet arm and a straight line connecting the axes of said driving shaft and driven shaft and guiding the pivot means between said control link and control arm for swinging movement through an arc intersecting that portion of said line connecting the axes of said driving shaft and driven shaft and lying between said shafts.

2. In a power transmission, a driving shaft, a crank operated by said driving shaft, a connecting rod operated by said crank, a driven shaft spaced from said driving shaft, ratchet means for rotating said driven shaft and including a ratchet arm pivoted coaxially with respect to said driven shaft, said connecting rod and ratchet arm extending substantially in the same direction, a drive link extending between said connecting rod and ratchet arm, pivot means between said drive link and said ratchet arm, pivot means between said drive link and connecting rod, said last named pivot means having its axis fixed relative to said connecting rod, a speed control having a control arm, pivot means at one end thereof, having its axis fixed relative to said driving shaft, a control link, pivot means between one end thereof and the other end of said control arm, pivot means between the other end of said control link and said connecting rod, said last named pivot means being coaxial with the pivot means between said connecting rod and drive link, said control arm extending from its fixed pivot means and into a space bounded by said connecting rod, drive link and ratchet arm and a straight line connecting the axes of said driving shaft and driven shaft and guiding the pivot means between said control link and control arm for swinging movement through an arc intersecting that portion of said line connecting the axes of said driving shaft and driven shaft and lying between said shafts, said pivot means between said control arm and said control link being adapted to occupy a position in alignment with the pivot means between said connecting rod and drive link and the pivot means between said ratchet arm and drive link, said drive link having a bight therein substantially at said position and receiving said pivot means between said control arm and control link when said pivot means is in said denoted position.

3. In a power transmission, a driving shaft, a crank operated by said driving shaft, a connecting rod operated by said crank, a driven shaft spaced from said driving shaft, ratchet means for rotating said driven shaft and including a ratchet arm pivoted coaxially with respect to said driven shaft, said connecting rod and ratchet arm extending substantially in the same direction, a drive link extending between said connecting rod and ratchet arm, pivot means between said drive link and said ratchet arm, pivot means between said drive link and connecting rod, said last named pivot means having its axis fixed relative to said connecting rod, a speed control having a control arm, pivot means at one end thereof having its axis fixed relative to said driving shaft and disposed at a position in proximity to the path of movement of said pivot means between said connecting rod and drive link, a control link, pivot means between one end thereof and the other end of said control arm, pivot means between the other end of said control link and said connecting rod, said last named pivot means being coaxial with the pivot means between said connecting rod and drive link, said control arm extending from its fixed pivot means and into a space bounded by said connecting rod, drive link and ratchet arm and a straight line connecting the axes of said driving shaft and driven shaft and guiding the pivot means between said control link and control arm for swinging movement through an arc intersecting that portion of said line connecting the axes of said driving shaft and driven shaft and lying between said shafts, said pivot means between said control arm and said control link being adapted to occupy a position in proximity to said line, said control link and control arm having bights therein receiving said driving shaft and the parts mounted thereon when said pivot means between said control arm and control link are in said denoted position.

4. In a power transmission, a driving shaft, a crank operated by said driving shaft, a connecting rod operated by said crank, a driven shaft spaced from said driving shaft, ratchet means for rotating said driven shaft and including a ratchet arm pivoted coaxially with respect to said driven shaft, said connecting rod and ratchet arm extending substantially in the same direction, a drive link extending between said connecting rod and ratchet arm, pivot means between said drive link and said ratchet arm, pivot means between said drive link and connecting rod, said last named pivot means having its axis fixed relative to said connecting rod, a speed control having a control arm, pivot means at one end thereof having its axis fixed relative to said driving shaft and disposed at a position in proximity to the path of movement of said pivot means between said connecting rod and drive link, a control link, pivot means between one end thereof and the other end of said control arm, pivot means between the other end of said control link and said connecting rod, said last named pivot means being coaxial with the pivot means between said connecting rod and drive link, said control arm extending from its fixed pivot means and into a space bounded by said connecting rod, drive link and ratchet arm and a straight line connecting the axes of said driving shaft and driven shaft and guiding the pivot means between said control link and control arm for swinging movement through an arc intersecting that portion of said line connecting the axes of said driving shaft and driven shaft and lying between said shafts, said pivot means between said control arm and said control link being adapted to occupy a position in proximity to said line, said control link and control arm having bights therein receiving said driving shaft and the parts mounted thereon when said pivot means between said control arm and control link are in said denoted position, said pivot means between said control arm and said control link being adapted to occupy a position in alignment with the pivot means between said connecting rod and drive link and the pivot means between said ratchet arm and drive link, said drive link having a bight therein substantially at said position and receiving said pivot means between said control arm and control link when said pivot means is in said last named position.

References Cited in the file of this patent

UNITED STATES PATENTS

| Number | Name | Date |
|---|---|---|
| 300,734 | Preston | June 17, 1884 |
| 354,989 | Nichols | Dec. 28, 1886 |
| 507,016 | Knowlton et al. | Oct. 17, 1893 |
| 669,499 | Aldrich | Mar. 12, 1901 |
| 982,666 | Girin | Jan. 24, 1911 |
| 1,142,574 | Huck | June 8, 1915 |
| 1,271,207 | Nickum | July 2, 1918 |
| 1,423,008 | Morton | July 18, 1922 |
| 1,700,562 | Doll | Jan. 29, 1929 |
| 1,749,879 | Goddard | Mar. 11, 1930 |
| 1,883,537 | Burton | Oct. 18, 1932 |
| 1,987,518 | Reilly | Jan. 8, 1935 |
| 2,136,023 | Russell | Nov. 8, 1938 |
| 2,163,596 | Fischer | June 27, 1939 |
| 2,318,357 | Becker | May 4, 1943 |
| 2,414,003 | Thompson | Jan. 7, 1947 |

FOREIGN PATENTS

| Number | Country | Date |
|---|---|---|
| 16,981 | Great Britain | June 9, 1904 |